Patented May 6, 1924.

1,493,392

UNITED STATES PATENT OFFICE.

WILLIAM THOMAS RYLE, OF THORNTON HEATH, ENGLAND.

MANUFACTURE OF BROWN FLOUR.

No Drawing.   Application filed December 24, 1923.   Serial No. 682,544.

*To all whom it may concern:*

Be it known that I, WILLIAM THOMAS RYLE, a subject of the King of Great Britain and Ireland, and a resident of Thornton Heath, county of Surrey, England, have invented certain new and useful Improvements in the Manufacture of Brown Flour, of which the following is a specification.

This invention relates to a process for producing a brown flour including wheat germs, in such manner that the flour, especially having regard to its germ content, shall be palatable, digestible and assimilable.

There are many prior proposals for incorporating wheat germs in a flour, and also for treating wheat germs with this object in view. I have found that by preparing the flour in accordance with the process herein set forth, the advantages of economy and increased food value accruing from the introduction of the germs are not offset by souring or other disadvantageous effect of the said germs; such disadvantages are entirely obviated, and products, such as bread, made from the flour are extremely palatable and can be produced with a mellow crust.

According to my process I take wheat grain and partly mill it to an extent whereby the germs can be extracted and separated by any known method. The partly milled wheat remaining after separation of the germs I will refer to as the remaining components of the wheat. To the separated wheat germs I add a suitable proportion of oatmeal flour (four parts of germs to one of oatmeal gives a good result), and roast the mixed germs and oatmeal together. By way of example, the roasting is carried on for about ten minutes at a temperature of 480 degrees Fahr. The roasted mixture is mixed with the remaining components of the wheat, and the milling of the latter and its additional roasted material completed.

The flour can afterwards be made into brown bread, biscuits and the like, by any usual and suitable process, and, obviously, when supplied for such purpose may have a slight admixture of salt and any of the well known constituents of flours intended for particular purposes.

I claim:—

A process for producing a brown flour of the kind containing wheat germs, which consists in partly milling wheat grain, separating the germs from the remaining components of the wheat, roasting the germs, adding a proportion of oatmeal to the separated germs during roasting, adding the roasted mixture to the remaining components of the wheat, and finally completing the milling thereof, substantially as herein described.

In testimony whereof I have affixed my signature hereto this 14th day of December, 1923.

WILLIAM THOMAS RYLE.